H. STIERS.
SPRING MOUNTING FOR VEHICLES.
APPLICATION FILED SEPT. 13, 1918.
1,301,016.
Patented Apr. 15, 1919.
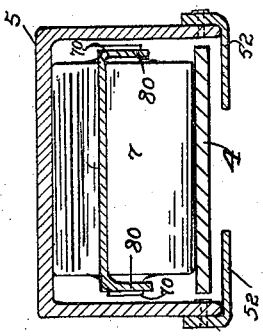
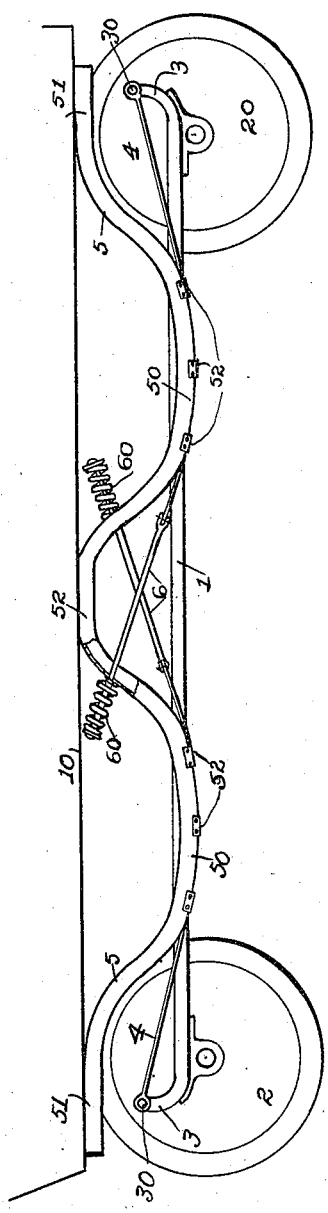
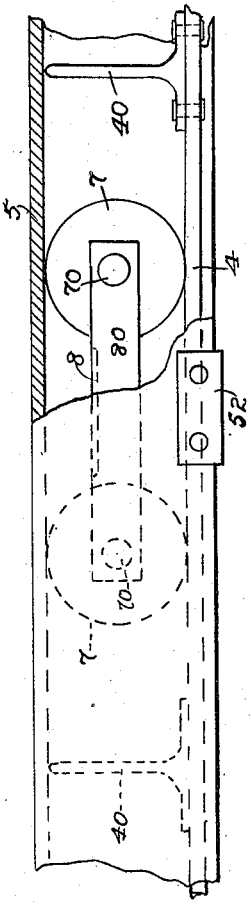
Inventor
Harry Stiers
By Henry L. Reynolds.
Attorney

UNITED STATES PATENT OFFICE.

HARRY STIERS, OF SEATTLE, WASHINGTON.

SPRING-MOUNTING FOR VEHICLES.

1,301,016.  Specification of Letters Patent.  Patented Apr. 15, 1919.

Application filed September 13, 1918. Serial No. 253,866.

*To all whom it may concern:*

Be it known that I, HARRY STIERS, a citizen of the United States, and resident of the city of Seattle, county of King, and State of Washington, have invented certain new and useful Improvements in Spring-Mountings for Vehicles, of which the following is a specification.

My invention relates to a yielding or spring supporting mechanism for vehicle bodies and comprises the novel means for mounting the vehicle body upon the chassis so as to secure a yielding movement between the two without violent fluctuation.

The object of my invention is to provide an improved means and method of mounting a vehicle body upon the chassis so as to absorb and compensate for the shocks arising from the vehicle passing over rough surfaces.

My invention comprises the novel parts and combinations of parts which will be herein described and then particularly pointed out in the claims.

In the accompanying drawings I have shown my invention embodied in the type of construction which illustrates my invention and the principles thereof, although it will be evident that modifications in construction might be employed without changing the essential characters of the device. The construction illustrated is, however, that which is now most preferred by me.

Figure 1 is a side view of a chassis and the lower portion of a vehicle body, illustrating the manner of supporting the body from the chassis.

Fig. 2 is a longitudinal section through a portion of the bearing member.

Fig. 3 is a cross section through the same.

In the drawings 1 represents a main longitudinal member of the chassis frame. This connects the axles of the front and rear wheels, 2 and 20. The particular construction of the chassis is immaterial to my invention so long as it provides a suitable member to which to attach the body suspension device. As herein shown, this chassis is provided with upwardly extending arms 3 at each end thereof adjacent the axis. Two of these should preferably be provided at each end of the chassis, one at each side of the vehicle. More than these might be employed, if for any reason it seems desirable.

To each of these supporting arms 3 is connected a suspension strap 4. This suspension strap, in the construction shown, is a flat steel bar, the same being of spring material so that it may bend under strain, so as to conform at all times to the curved sections 50 of the rocker bars 5. These rocker bars 5 are provided with two downwardly extending bends or rocker-like curves 50 located at opposite sides of the center thereof. The end sections 51, as well as the central section 52, is secured to the body 10.

These rocker bars 5 are preferably made of a channel cross section, as is shown in Fig. 3. The suspension straps 4 are of a width which will permit their entering between the flanges of the channel bar 5. The end of the suspension straps 4 opposite that which is secured by pivot pin 30 to the arms 3, is provided with a yielding supporting connection with either the body or a member fixed thereto as with a part of the channel bar beyond that rocker section 50 which is nearest its supporting arm 3.

The manner of doing this which I now prefer, consists in attaching to the suspension strap a rod 6, which passes through a hole in the channel bar 5 at a point adjacent to the bottom of the body and surrounding this rod with a coil spring 60. The spring 60 thus takes the strain which is placed upon the rod 6 and forms the yielding or resilient member of the device.

Between the suspension straps 4 and the rocker bars 5 are placed rollers, as 7, which form a roller bearing between these two members, 4 and 5, thus reducing the friction which would otherwise be caused by relative movement between the two. The exact construction of the roller bearing is immaterial. As herein shown, I have connected the rollers 7 in pairs by a plate 8. This plate has a central portion extending transversely between the two rollers which are connected therewith, the same being shown in section in Fig. 3.

At each side of this central section flanges 80, which extend at their ends beyond the central section of the plate, are perforated to form bearings for the journals 70 of the rollers 7.

To prevent undue movement of the rollers lengthwise of the plate into which they are placed, I may provide stops, as 40, which will limit their movement. To prevent separation of the suspension straps 4 and the channel bar 5 I have shown fingers 52 which are secured to the channel bars and which project beneath the suspension straps 4 and thus prevent the possibility of any separation between these two bars.

When the wheel of the vehicle passes over an obstruction, the spring 60 which is connected with that suspension strap 4 which is associated with this wheel is compressed, the wheel rises relative to the body. This produces a compression of its spring 60 and a relative longitudinal movement between the suspension bar 4 and the channel strap 5. By employing two of the rocker sections 50, one forward and the other rear at the rear, instead of one, the pitching of the body fore-and-aft is prevented. The movement is an up-and-down movement and one which is very easy and moderate in amount.

It is believed that the operation of the device will be apparent without further description.

What I claim as my invention is:

1. A spring mounting for vehicle bodies comprising rocker bars secured to the body, flexible supporting elements for said rocker bars having one end attached to the chassis and extending lengthwise of the body beneath the rocker bars, said supporting elements being connected at one end with the body and at the other with the chassis, and springs inserted as a tension element to sustain said bars.

2. A spring mounting for vehicle bodies comprising rocker bars secured to the under side of the body, each of said rocker bars having a forwardly and a rearwardly positioned rocker curve, two flexible elements supporting said rocker bars, said flexible elements each having one end secured to the chassis respectively forward and rearward of said rocker bar and extending under the rocker curve which is at its end of the vehicle, rods to which the other ends of said flexible elements are secured, and a spring for each rod so placed as to form tension elements between said rods and the vehicle body.

3. A spring mounting for vehicle bodies comprising rocker bars secured to the body and curving downwardly, flexible elements supporting said rocker bars having one end supported from the chassis, rods connected with the other ends of said flexible connectors, spring tension elements between said rods and the vehicle body, and roller bearings between the rocker bars and the flexible connectors.

4. A spring mounting for vehicle bodies comprising a downwardly open channel bar secured to the bottom of the chassis and bent to form two downwardly curving rocker sections, flexible suspension straps supported at one end from the chassis and disposed under the adjacent rocker sections, a spring forming a connection between the other end of said suspension straps and the channel bar adjacent the end of the other rocker section, and roller bearings between the suspension straps and said rocker sections.

Signed at Seattle, Washington, this 4th day of September, 1918.

HARRY STIERS.

Copies of this patent may be obtained for five cents each, by addressing the "Commissioner of Patents, Washington, D. C."